Figure 1:
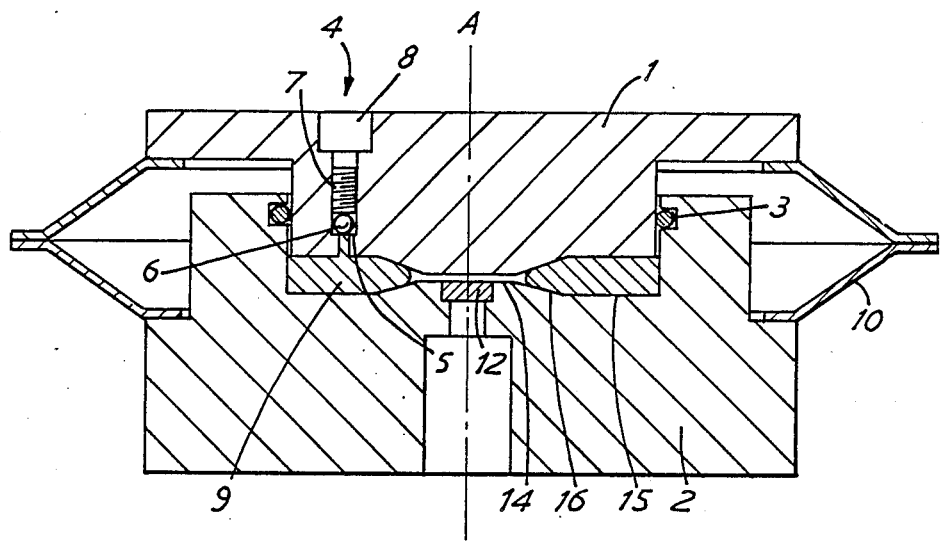

United States Patent [19]

Denne

[11] Patent Number: 4,875,214
[45] Date of Patent: Oct. 17, 1989

[54] X-RAY LASER

[76] Inventor: William Denne, The Lane House, 10B Church St., Great Shelford, England

[21] Appl. No.: 40,773
[22] PCT Filed: Aug. 8, 1986
[86] PCT No.: PCT/GB86/00480
    § 371 Date: Jun. 2, 1987
    § 102(e) Date: Jun. 2, 1987
[87] PCT Pub. No.: WO87/00981
    PCT Pub. Date: Feb. 12, 1987

[30] Foreign Application Priority Data

Aug. 8, 1985 [GB] United Kingdom ............ 8519878

[51] Int. Cl.⁴ .................................. H01S 3/30
[52] U.S. Cl. ............................ 372/5; 372/92
[58] Field of Search ........... 372/5, 58, 92; 376/105, 376/98

[56] References Cited

U.S. PATENT DOCUMENTS

| | | |
|---|---|---|
| 3,751,666 | 8/1973 | Hug . |
| 3,961,197 | 6/1976 | Dawson ................ 372/5 |
| 4,252,607 | 2/1981 | Thode ................ 376/105 |
| 4,263,095 | 4/1981 | Thode ................ 376/105 |
| 4,611,327 | 9/1986 | Clark et al. ............ 372/58 |

OTHER PUBLICATIONS

Dahlbacka, R. et al., "Imploding Z Pinch X-Ray Laser" 2318B *Applied Physics B. Photophysics and Laser Chemistry*, vol. B28 (1982), June/July, No. 2/3, pp. 152–153.

Maxon, P. S., "A Gas Puff Soft X-Ray Laser Target Design", *Journal of Applied Physics*, 57, (1985), Feb. No. 3, pp. 971–972.

Hagelstein, P. L., "Review of Radiation Pumped Soft X-Ray Lasers", *Plasma Physics*, 25, (1983), Dec., No. 12, pp. 1345–1367.

Document from U.S. Department of the Navy, "Appendix 2/Current SDIO Objections", Comments on Proposal from Optical Research, Cambridge, U.K.

*Primary Examiner*—Leon Scott, Jr.
*Attorney, Agent, or Firm*—Robert F. O'Connell

[57] ABSTRACT

The X-ray laser exploits the violent collapse of a bubble (11) in liquid (9) to produce an intense concentration of energy, as a piston (1) is compressed violently into a cylinder (2). X-rays from this source are used to produce a population inversion within the bubble wall. This can then give rise to X-ray laser emission approximately parallel to the bubble wall, through a window (12).

10 Claims, 1 Drawing Sheet

U.S. Patent

Oct. 17, 1989

4,875,214

X-RAY LASER

The principles of laser operation are well understood. The major difficulty in producing an X-ray laser is the extreme threshold power level needed. This threshold is proportional to the sixth power of frequency, so a 0.1 nanometer laser would require approximately $10^{21}$ watts to operate under the conditions of the original ruby lasers. This specification describes an apparatus which will attain X-ray laser conditions efficiently and at relatively low energy inputs.

For a given energy, power is increased by shortening the duty cycle. As threshold power is proportional to cavity volume and inversely proportional to the effective optical length of the cavity, a minimum cavity cross-section and maximum optical path length must be engineered. As the only practical method of producing inverted X-ray states is photo-ionisation, a discrete X-ray driving source must be provided. These criteria may all be satisfied by exploiting the violent collapse of a bubble.

The present device consists essentially of a bubble subject to violent collapse. The environment of the bubble is most likely to be liquid, but may be a colloid, suspension, slurry, gel, fluidised bed, solid or other medium which is or becomes fluent under impact, referred to herein generically as a fluent medium. The bubble shape is most likely to approximate a cylinder of high aspect ratio, i.e. a disc-like cylinder, though a range of other bubble shapes may provide advantages. The collapse will be precipitated by externally applied pressure though this could conceivably be the ambient pressure of the environment.

In the preferred embodiment, a bubble in liquid metal is used because the vapour pressure in the bubble can be very low, the ratio of specific heats for the vapour can be high, repeated collapse cycles can occur without chemical decomposition and careful alloying can provide a range of operational X-ray transitions. The bubble is essentially cylindrical with possibly a slight taper to encourage uni-directional emission. This configuration may be stably maintained by control of the liquid flow pattern during collapse. This control may be exercised by the profiles of the inner surface of the container, by inducing rotational or other non radial flow patterns or by inducing electric currents or magnetic fields. It is envisaged that rapid collapse will be induced by the application of very high external pressures. The more rapid the collapse, the more adiabatic the heating processes.

The mode of action is as follows. The collapse of the bubble can provide a very hot core either by adiabatic compression of the residual vapour within the bubble or by impact of opposing bubble walls at the instant of collapse. By appropriate selection of bubble dimensions, applied pressure, bubble vapour pressure and collapse geometry, it is possible to arrange that the core will have a very small cross section and will be hot enough to provide an intense thermal X-ray source for a short instant of time. The emitted X-rays will be absorbed in the cold bubble wall surrounding the hot core. The emitted radiation will propagate at the speed of light for a transparent core, whereas the energetic electrons associated with the heat wave will travel significantly more slowly and can be impeded by circulating currents in the liquid. Preferential photoionisation can therefore occur in the bubble wall and give rise to an inverted X-ray transition. The inversion may be dynamic or intrinsic to the transition if the ground state lifetime is significantgly less than the excited state lifetime. The high density of the bubble wall will ensure rapid absorption of the incident X-rays providing a small effective cavity volume. Calculation indicates that laser conditions may easily be attained.

Super-radiant emission can occur in the bubble wall and the gain will be greatest parallel to the surface. However, X-rays have a refractive index of less than one in matter, so the reduction in density toward the centre of the core will cause self focusing of the super-radiant beam along the axis of the device. Inelastic scattering will delete the electron density along the central beam. This will further enhance self focusing and will provide a relatively loss free exit path for the super-radiant emission.

The high pressures at the instant of collapse will cause the liquid in the bubble wall, to be substantially compressed. This will raise the effective absorption coefficient, so reducing the effective cavity cross section.

The X-ray cavity will be a dynamically changing volume. As the heat wave expands, so the zone of inversion will expand with it until the conditions of stimulated X-ray emission can no longer be sustained.

While only a fraction of the total energy of the system will be emitted as X-rays, the remainder can be efficiently recouped mechanically and used for a subsequent shot. In this fashion, an oscillating system may be exploited to provide a very efficient conversion of energy into a super-radiant X-ray beam.

Figure 2:
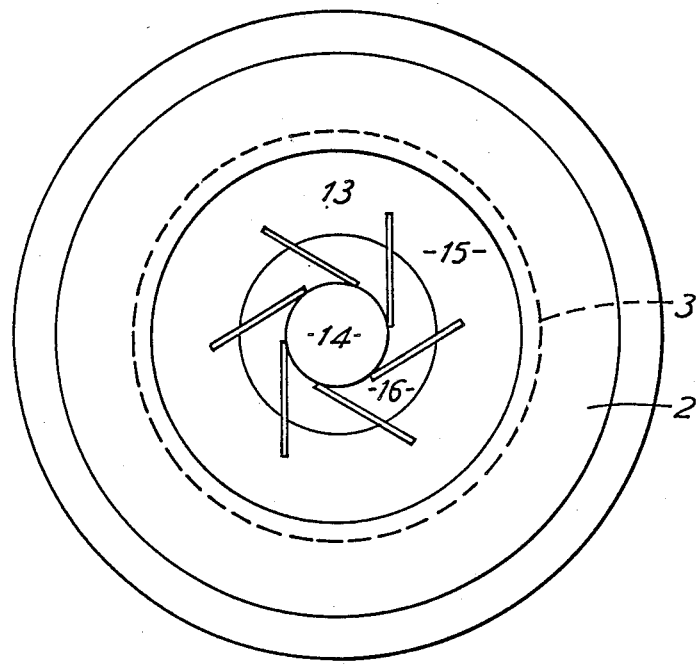

The invention will be described in more detail, by way of example, with reference to the accompanying drawings, in which:

FIG. 1 is an axial section, on line I—I in FIG. 2, of an X-ray laser embodying the invention, and FIG. 2 is a plan view of the cylinder part of the laser.

In FIG. 1 there is axial symmetry about the line A—A. A piston 1 fits a cylinder 2 with an O-ring seal 3. An inlet 4 in the piston is counterbored to form a seating 5 for a sealing ball 6. A clamping screw 7 is provided to tighten the ball on to its seat and, above the screw, is a well 8. The assembly may be filled with a preset amount of mercury 9 by a sequence of compressing the piston and cylinder assembly to expel air then expanding to draw in mercury from the well 8. The valve can be closed tight when all air has been expelled.

An annular spring 10 urges the piston out of the cylinder and thereby ensures that an equilibrium a bubble 11 exists in the mercury. The inner profiles of the piston and cylinder ensure that at equilibrium, a symmetrical annulus of mercury exists around an essentially cylindrical bubble of mercury vapour, i.e. a flat cylindrical, disc-like bubble 11. This is attained by providing a central portion 14 with small clearance and an outer portion 15 with much larger clearance, with a coned transitional zone 16 therebetween. Surface tension and gravity may be exploited to provide the uniform annulus.

To excite the system, a rapid compression of the piston and cylinder arrangement is undertaken with a large applied pressure. This may be generated by a hammer blow or detonation of an explosive charge. The compression causes the cylindrical bubble of mercury vapour to contract with increasing rapidity to the instant of collapse. A collimated X-ray beam is then formed along the axis as outlined above. This beam passes through the X-ray transparent window 12 in the centre of the cylinder 3. The concentration of energy in this window will doubtless produce a hole, but it may be arranged that leakage of air into the assembly or of mercury out of the assembly will be insignificant during the brief period of operation. A new window may be provided for each shot.

Asymmetric profiling of piston and cylinder faces may be exploited to produce undirectional emission by producing a tapered cylindrical bubble which will collapse progressively from the piston toward the X-ray window.

The rebound energy after peak compression will be converted into potential energy in the spring 10. This in turn will initiate a further compression cycle and as X-ray emission may be arranged to be the major source of loss, the initial impact energy may be efficiently converted to X-ray energy in a series of compression cycles. The cycles may be sustained by driving the system at its resonance frequency, e.g. using an electrically actuated hammer.

A rotation of the mercury about the axis of symmetry A—A may be be generated by vanes 13 or similar devices on the surface of the piston, cylinder or both, as shown in FIG. 2. The rotational flow imparted to the mercury may be exploited to stabilise the geometry of the bubble during collapse.

An axial magnetic field between piston and cylinder may be provided. The radial component of the mercury velocity will produce a circulating induced current which will also tend to stabilise the collapse geometry and will impede the propagation of fast electrons in the heat wave.

I claim:

1. An X-ray laser comprising a rigid structure confining a substantially incompressible fluent medium, said medium surrounding a substantially cylindrical cavity of residual vapour of said medium, said rigid structure including spaced rigid surfaces intersected by an axis of the cylindrical cavity and constraining the fluent medium therebetween, means for causing violent collapse of the cavity to form an extremely hot dense plasma of said medium along said axis, the formation of said plasma causing intense thermal X-ray emission, said emission pumping energy into said medium to effect an X-ray inversion within an elongated volume along said axis, said X-ray inversion causing super-radiant x-ray emission along said axis.

2. An X-ray laser according to claim 1, wherein the violent collapse of the cavity is achieved by the compression of the fluent medium between said spaced rigid surfaces.

3. An X-ray laser according to claim 2, wherein the fluent medium and cavity are confined within a cylinder and a piston, said spaced rigid surfaces being the end surface of the piston and the facing surface of the cylinder.

4. An X-ray laser according to claim 2, wherein the cavity is tapered so that said collapse is phased along said axis to enhance unidirectional emission, of said superradiant x-rays ameliorate problems with residual gas.

5. An X-ray laser according to claim 1, wherein the thermal X-radiation is generated by at least one of the mechanisms of (1) adiabatically compressing the residual vapour of said medium within the cavity until it attains sufficient temperature and density to radiate significantly at X-ray wavelengths and (2) causing the cavity to collapse with such velocity that on impact of opposing walls of the fluent medium such a temperature and density are produced.

6. An X-Ray laser according to claim 1, wherein the intense thermal X-radiation source generated by the plasma excites an inverted X-ray transition in a thin cylindrical sheath of relatively cold fluid surrounding a hot core.

7. An X-ray laser according to claim 6, wherein the radial increase in electron density from the hot core to the cold sheath provides an X-ray waveguide along said axis to provide a self-focusing, low loss exit path for the stimulated X-ray beam.

8. An X-ray laser according to claim 7, wherein the X-ray waveguide formed by the radial electron density gradient acts as a single mode cavity for stimulated emission in the walls of the waveguide.

9. An X-ray laser according to claim 8, in which the cylindrical cavity resonates to produce a series of X-ray laser pulses by repetitive collapse, with recoupling of energy not emitted as X-radiation back into the system in between successive collapses.

10. An X-ray laser according to claim 1, wherein stability of the collapse is ensured by at least one of the following factors: (a) profiling of said surfaces; (b) applied magnetic fields; (c) incorporation of solid or viscoelastic components within the fluent medium.

* * * * *